July 25, 1961 V. R. GIBSON, JR 2,994,063

REMOTE WIRELESS CONTROL SYSTEM

Filed March 21, 1960

INVENTOR:
VAN R. GIBSON, JR.

BY Donald N. Timbie

HIS ATTORNEY.

United States Patent Office 2,994,063
Patented July 25, 1961

2,994,063
REMOTE WIRELESS CONTROL SYSTEM
Van R. Gibson, Jr., North Syracuse, N.Y., assignor to General Electric Company, a corporation of New York
Filed Mar. 21, 1960, Ser. No. 16,568
5 Claims. (Cl. 340—156)

This invention relates to remote wireless control systems, and more particularly to such systems of the type suitable for use in controlling at a distance a function in a conventional television or radio receiver set.

It is an object of this invention to provide a remote wireless control system of simple and economical design.

A further object is to provide such a system which is particularly designed for the control of audio volume in a conventional television or radio receiver set, or any other control such as contrast, brightness, etc.

Yet a further and more specific object of my invention is to provide such a system which includes as one cost-reducing component thereof a bistable tunnel diode.

Another specific object is to provide such a system wherein a plurality of impulses are required to effect operation of the system thereby precluding accidental operation due to lightning, operation of light switches, and the like.

According to one aspect of my invention, I provide a wireless remote control system which includes conventional means for transmitting either of two different frequency modulations of an RF signal and for receiving either of those transmitted signals. A frequency sensitive reed relay is provided with first and second normally open reed contacts, each of which vibrates in response to one of the signals. Each reed contact when vibrating is closed for a portion of each cycle at one end of its vibratory movement. A predetermined voltage input signal is fed to a control circuit arrangement which includes a bistable tunnel diode and a capacitor connected in parallel therewith. A pair of current regulating resistances are connected in series with each other, and with the diode and the capacitor. The first reed contact of the reed relay is included in a short circuit across one of the resistances; the second reed contact is connected in series with a third current regulating resistance in a circuit in parallel with the diode and with the capacitor and in series with the first pair of resistances.

With the foregoing arrangement the capacitor is charged whenever the first reed contact is closed and is discharged whenever the second reed contact is closed. A predetermined number of closures of the first reed contact will charge the capacitor sufficiently to cause the diode to assume and maintain the higher of its two stable states thereby to provide a relatively high output signal. When the second reed contact is vibrated, the capacitor is discharged upon a predetermined number of closures of the reed contact to cause the diode to assume and maintain the lower of its two stable states thus to give a second lower output signal.

Thus, by utilization of the characteristics of the bistable tunnel diode, the desired one of either of two output control signals is continually provided in response to a brief period of transmission of a controlling signal.

The subject matter which constitutes my invention is particularly pointed out and distinctly claimed in the concluding portion of this specification. The invention, both as to organization and method of operation together with further objects and advantages thereof, may best be understood by reference to the following description taken in conjunction with the accompanying drawing.

Figure 1:
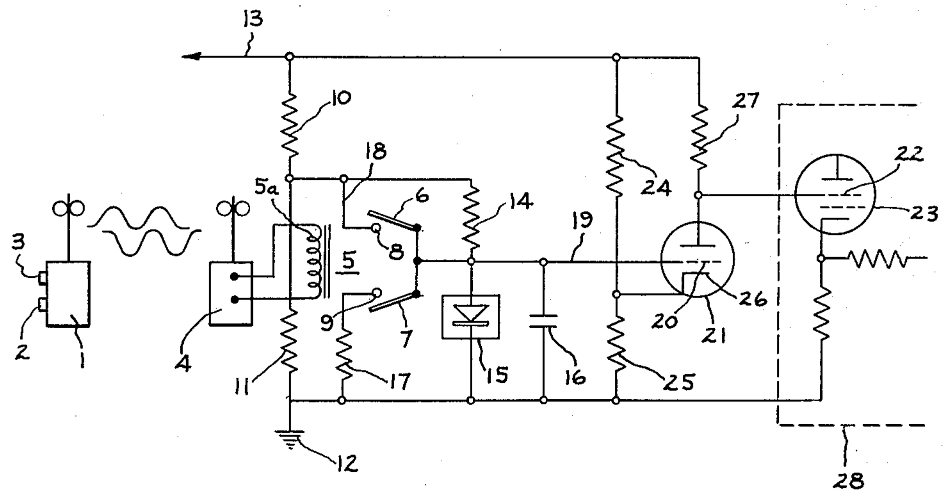
FIGURE 1 is a schematic diagram of the improved control system of this invention.

Referring now to FIGURE 1 of the drawing, there is shown a conventional transmitter device 1 having a pair of pushbuttons 2 and 3; when pushbutton 2 is depressed transmitter 1 emits an RF signal with a particular predetermined modulation frequency, and when button 3 is depressed the RF signal receives a different modulation frequency. A conventional receiver device 4 is constructed so as to be able to receive either of the two emitted signals. It will be understood, of course, that in the contemplated usage of my invention the receiver 4 will normally be incorporated as part of the mechanism which is to be controlled (such as a television set whose audio volume is to be controlled) whereas the transmitter 1 will be at some distance from the television set, generally located where it is convenient for manual operation by a seated viewer.

The signal received by receiver 4 is used to control the operation of a conventional frequency-sensitive reed relay, generally indicated by the numeral 5, having a coil 5*a* connected to receive the output of receiver 4, a first reed 6 which is vibratory in response to receipt of the modulated RF signal provided upon depression of button 2, and a second reed contact 7 vibratory in response to the modulated signal received upon depression of pushbutton 3. In other words, reeds 6 and 7 are vibrated independently of each other, the selection of one or the other being dependent on the particular RF signal modulation. It will, of course, be understood that in the conventional manner the contacts 6 and 7 engage their respective stationary contacts 8 and 9 only for a small period of time during each cycle of vibration, and are biased and remain in an open position out of engagement with any stationary contact when the particular signals to which they are sensitive are not being emitted by transmitter 1.

Turning now to the circuit arrangement in which reed contacts 6 and 7 are incorporated, it includes a voltage divider arrangement incorporating a pair of current regulating resistances 10 and 11 which are in series with each other between ground 12 and a conductor 13 receiving constant D.C. input signals which may, for instance, be on the order of 130 volts. A third current regulating resistor 14 is connected in series with resistor 10. Both resistors 10 and 14 are also in series both with a bistable tunnel diode device 15 and a capacitor 16, the capacitor in turn being connected in parallel with the diode 15.

Figures 2, 3:
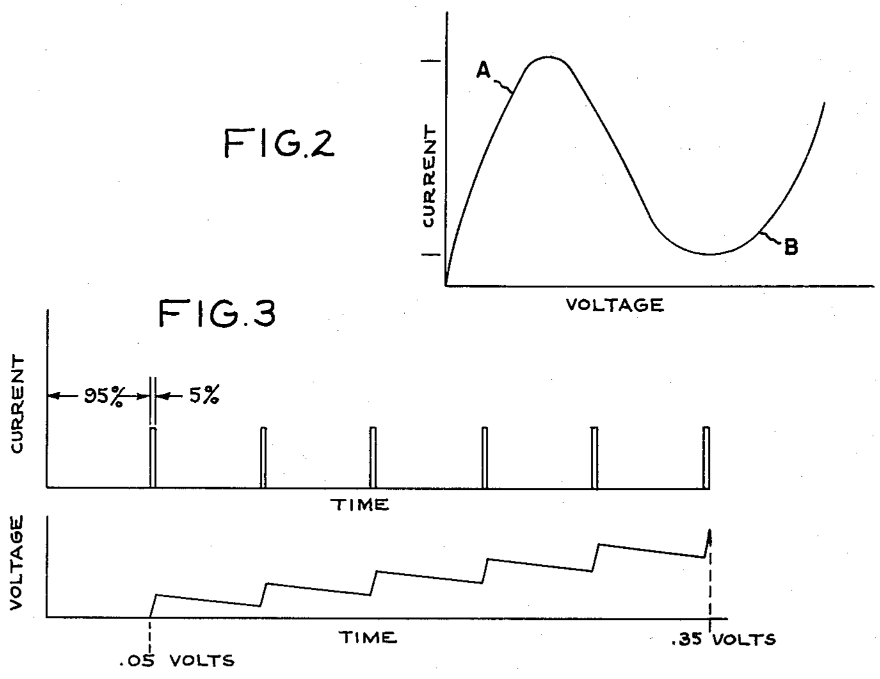
FIGURE 2 is a graph showing the voltage-vs.-current characteristics of the aforementioned bistable tunnel diode upon the application of forward bias to the diode.
FIGURE 3 includes two related graphs showing certain characteristics of the system of FIGURE 1 as affected by intermittent closure of a reed contact.

Bistable tunnel diodes are negative resistance devices which are formed by heavily doping both the "p" and "n" crystals of a semi-conductor diode device. With such devices, while current and voltage increase together up to a certain point, when a certain portion of the characteristic curve is reached there is a decrease in current which creates a negative resistance effect. The drop that appears in the volt-ampere characteristic is shown in FIGURE 2. In effect, what occurs is that the high point "A" of the curve and the low point "B" of the curve are stable positions at which the voltage across the device tends to remain regardless of variations in current until the current variation is major enough to cause a shift from one to the other of the two positions.

While the precise construction and various other characteristics of tunnel diodes do not form any part of my invention, my invention lying in the utilization of a circuit which incorporates a tunnel diode, such devices are fully set forth in, for instance, the article entitled "New Phenomenon in Narrow Germanium p-n Junctions," by Leo Esaki which appears on page 603, volume 109 of the 1958 "Physical Review." The recognition of such devices by the electronics industry is shown by discussion in trade papers such as, for instance, "Tunnel Diode Looms Big in Semi-Conductors," an article by Barry Miller which appears in column 1, page 1 of the June 29, 1959, issue of "Electronic News" (volume 4, number 151).

A fourth current regulating resistor 17 is provided in the circuit of FIGURE 1, in this case the resistor being connected in series with reed contact 9 in a circuit which, when reed 7 makes a closure, is in parallel with the diode 15 and the capacitor 16 but which is in series with resistors 10 and 14. The other reed contact 8 of reed relay 5 is connected to a conductor 18 which forms a short circuit across resistor 14 when the reed relay 6 is closed.

The operation of the circuitry as thus far described will now be explained. With both reeds 6 and 7 remaining in the open position, the resistors 10 and 11 form a voltage divider with current regulating properties, as stated above, and they, together with resistor 14, are adjusted so that the tunnel diode 15 draws just enough current to clamp the voltage across the condenser 16 to, for instance, .05 volt D.C. which may be selected as the lower of the two bistable conditions of the diode. If now it is desired to increase the output signal from .05 volt D.C. to .35 volt D.C., button 2 on transmitter 1 is pushed to cause the corresponding modulated RF signal to be received by receiver 4 and vibrate reed 6.

The condition of the current through the reed (and consequently the current supplied to the diode and the capacitor) is shown in the upper curve of FIGURE 3 which also represents on a comparative basis the length of time that the reed 6 is open compared to the length of time it is closed for each cycle of the RF signal being received. The 5% closed time shown is typical, although it is not intended to be limiting insofar as this invention is concerned. Referring now to the lower curve of FIGURE 3, which has the same time abscissa as the upper curve and an ordinate representing voltage, the charging of the capacitor 16 by the intermittent closures of reed 6 is shown. It will be observed that prior to the closing of the reed a voltage of .05 volt controlled by the diode was provided. However, upon the closing of the reed 6 the current controlling resistor 14 is short circuited so that a substantially larger current than previously is supplied to the circuit including the diode and the capacitor. As a result of this increased current, the capacitor is charged during the closed period of reed 6 as shown. During the ensuing open period, there follows a discharge of the capacitor but one which is so slow that when the next closed period of the reed occurs the voltage across the capacitor is at a substantially higher level than before. Upon reclosing the reed, the capacitor is again charged quickly but for a very brief period of time and thereafter during the open period of the reed there is again a slow discharge. As can be seen, this continues until the higher diode stable state of .35 volt is reached, at which point the diode clamps the voltage across the capacitor 16 at .35 volt to provide a new higher output signal.

It will be observed that, with the characteristics of the components as described, it takes six cycles of vibration of reed 6 for the change from one stable condition of the diode to the other stable condition to occur. This particular aspect of the invention is provided as a delay to eliminate outside sources of actuation of the diode such as, for instance, lightning, the turning on and off of light switches, etc. In other words by the delay of the actuation of the diode for several cycles of the emitted control signal from the transmitter, accidental operations of the control are virtually eliminated.

When it is desired to return to the original .05 volt stable condition of the diode, button 3 of the transmitter is pushed to provide the modulated RF signal which will vibrate reed contact 7. As reed contact 7 vibrates into and out of its closed position (in substantially the same manner as reed contact 6) it completes the circuit across the capacitor 16 through current regulating resistor 17. As a result, during the closed period of reed contact 7 the capacitor is discharged quite rapidly but at a rate which is controlled by the resistor so that after a number of cycles of the modulated RF wave, which number may be the same as previously described in connection with FIGURE 3, the amount of discharge of the capacitor 16 causes the diode to jump back to its .05 volt stable state.

In other words, the circuit as described provides, in response to a brief actuation of reed 6, a charging effect on capacitor 16 which causes the bistable tunnel diode 15 to jump to its higher stable state thereby providing a first higher output signal across capacitor 16. Upon a brief depression of button 3 of transmitter 1, reed 7 is actuated to cause a gradual discharge of the capacitor 15 until the tunnel diode jumps to its lower bistable condition to give a second lower output signal across the capacitor. In both cases, a number of cycles of the actuating signal are required in order to preclude any possibility of accidental actuation of the tunnel diode.

The output signal, either .05 volt or .35 volt, is applied through conductor 19 to the grid 20 of a suitable device 21, such as a triode, for instance, thus changing its plate current which, through direct coupling, controls the voltage of the screen grid 22 of the audio I.F. amplifier 23 of a television or radio receiver. In the conventional manner, resistors 24 and 25 may be provided to set the bias of the cathode 26 of the triode 21, which in turn adjusts the voltage of the screen grid 22 of amplifier 23 to the proper audio output level in the television receiver 28. A further conventionally used resistor 27 also sets the screen voltage and control range. It will of course be recognized that my invention lies in the simple and economical provision of two remotely provided voltage signals, and that the use of the control signal on the grid of a triode to effect control of a television receiver audio system is described only for purposes of illustration.

While in accordance with the patent statutes I have described what at present is considered to be the preferred embodiment of my invention, it will be apparent to those skilled in the art that various changes and modifications may be made therein without departing from the invention, and I therefore aim in the appended claims to cover all such changes and modifications as fall within the true spirit and scope of the invention.

What I claim as new and desire to secure by Letters Patent of the United States is:

1. A wireless remote control system for use with means for transmitting either of two signals of different frequencies comprising: means for receiving either of said signals; a frequency sensitive reed relay having first and second normally open reed contacts respectively viratory in response to said signals, each said reed contact when vibrating being closed part of each cycle; a control circuit arrangement adapted to have a predetermined voltage input signal, said circuit arrangement including a bistable tunnel diode and a capacitor connected in parallel with each other, a pair of current regulating resistances connected in series with each other and with said diode and said capacitor, a short circuit across one of said resistances including said first reed contact, and a circuit in parallel with said diode and said capacitor and in series with said pair of resistances including a third current regulating resistance and said second reed contact in series with each other, said capacitor being charged upon a predetermined number of closures of said first reed contact sufficiently to cause said diode to assume and maintain the higher of its two stable states, said capacitor being discharged upon a predetermined number of closures of said second reed contact sufficiently to cause said diode to assume and maintain the lower of its two stable states.

2. The apparatus defined in claim 1 in combination with a controlled device connected across said capacitor and said diode.

3. The apparatus of claim 1 in combination with amplification means connected to receive the output signal from said diode and said capacitor, and an audio I.F. amplifier having a screen grid voltage directly controlled by the amplified output signal.

4. A wireless remote control system for use with means for transmitting either of two signals of different frequencies comprising: means for receiving either of said signals; a frequency sensitive reed relay having first and second normally open reed contacts respectively vibratory in response to the signals, each said reed contact when vibrating being closed part of each cycle; a control circuit arrangement adapted to have a predetermined voltage input signal, said circuit arrangement including a bistable tunnel diode and a capacitor connected in parallel with each other, first and second current regulating resistances connected in series with each other and with said diode and said capacitor, a short circuit across the second of said resistances including said first reed contact, a circuit in parallel with said diode and said capacitor and in series with said first and second resistances including a third current regulating resistance and said second reed contact in series with each other, a fourth current regulating resistance in series with said first resistance and in parallel with all other components of said circuit arrangement and forming with said first resistance a voltage divider, said capacitor being charged upon a predetermined number of closures of said first reed contact sufficiently to cause said diode to assume and maintain the higher of its two stable states, said capacitor being discharged upon a predetermined number of closures of said second reed contact sufficiently to cause said diode to assume and maintain the lower of its two stable states.

5. A wireless remote control system for use with means for transmitting either of two signals of different frequencies comprising: means for receiving either of said signals; a frequency sensitive reed relay having first and second normally open reed contacts respectively vibratory in response to the signals, each said reed contact when vibrating being closed part of each cycle; a control circuit arrangement adapted to have a predetermined voltage input signal, said circuit arrangement including a bistable tunnel diode and a capacitor connected in parallel with each other, first and second current regulating resistances connected in series with each other and with said diode and said capacitor, a short circuit across the second of said resistances including said first reed contact, a circuit in parallel with said diode and said capacitor and in series with said first and second resistances including a third current regulating resistance and said second reed contact in series with each other, a fourth current regulating resistance in series with said first resistance and in parallel with all other components of said circuit arrangement and forming with said first current regulating resistance a voltage divider, said capacitor being charged upon a predetermined number of closures of said first reed contact sufficiently to cause said diode to assume and maintain the higher of its two stable states, said capacitor being discharged upon a predetermined number of closures of said second reed contact sufficiently to cause said diode to assume and maintain the lower of its two stable states; and an audio volume control arrangement controlled by the output signal from said circuit arrangement, said volume control system including a triode, said diode and said capacitor being connected to the grid of said triode to provide the output signal thereto, and an audio amplifier having its screen grid directly coupled to the plate of said triode to be controlled thereby.

No references cited.